Patented Mar. 20, 1945

2,371,870

UNITED STATES PATENT OFFICE 2,371,870

ADHESIVE COMPOSITIONS

Charles F. Brown, Nutley, and George E. Hulse, Jr., Passaic, N. J., assignors to United States Rubber Company, New York, N. Y., a corporation of New Jersey No Drawing. Application July 5, 1940, Serial No. 344,116

4 Claims. (Cl. 154—43)

The present invention relates to improved adhesive compositions particularly useful for bonding rubber to metal and other rigid surfaces.

This case is a continuation-in-part of our application Serial No. 304,942, filed November 17, 1939.

An object of the invention is to provide an adhesive giving excellent bonding of rubber to metal, not only at ordinary atmospheric temperatures but also at elevated temperatures. A further object is to provide an adhesive which after application will retain its tack after several days of ageing in light and air and which does not require wetting with a solvent. A still further object is to provide an adhesive which is equally adaptable to open steam or to mold cures over a relatively wide range of curing times and temperatures.

Broadly the adhesive composition comprises a potentially reactive resinous reaction product of cashew nut shell oil and another phenol, a hardening agent for the resin, vulcanized rubber which has been solubilized by suitable depolymerization treatment, and an organic solvent. Resins of the type referred to have been described in U. S. patent application Serial No. 142,658, filed May 14, 1937, now issued as U. S. Patent No. 2,203,206 on June 4, 1940. The reference to "another phenol" as in said patent, refers to a phenol which is reacted with the cashew nutshell oil (itself of phenolic nature), as represented in and set forth in said U. S. Patent No. 2,203,206. They are Durez resins of a certain type, those commercially available being known as Durez resins Nos. 7355 and 8118, used hereinbelow in illustrating the invention. These Durez resins are manufactured by General Plastics, Inc. They are potentially reactive and may be set to a hard insoluble infusible state by a methylene-producing body such as formaldehyde, paraformaldehyde, and hexamethylene tetramine, which latter may be used in amounts ranging from 2 to 40 parts by weight per 100 parts of reactive resin.

Durez resin 7355 is a dark, hard, brittle resin at room temperature, but can be softened by the application of heat. It is soluble in alcohol, benzenoid hydrocarbons, and chlorinated hydrocarbons, but not in petroleum solvents such as naphtha or gasoline. Durez 8118 is analogous to Durez 7355 in constitution but is in a lower state of polymerization. It is a mobile liquid at room temperatures and behaves much the same as Durez 7355 toward solvents, chemical agents, etc. While either of these resins may be used alone for the purposes of the present invention it is preferred to use a mixture of the two as this increases the stability, tack, adhesive properties, and generally improves the handling qualities of the adhesive mixture.

Solubilized vulcanized rubber may be prepared by treating rubber combined with sulphur, such as vulcanized rubber or reclaim, with oxidizing agents such as alkyl nitrites, organic peroxides, nitroso compounds, or unsymmetrically substituted hydrazines or their salts, e. g. butyl or amyl nitrite, benzoyl peroxide, alpha-nitroso-beta-naphthol, zinc salt of phenyl hydrazine, in a solvent such as solvent naphtha or benzol for several hours with vigorous stirring. A solution of depolymerized vulcanized rubber may be prepared by the method shown in Gibbons and Binmore U. S. P. 1,745,533.

In joining the rubber to other surfaces, both surfaces may be coated with the adhesive or the adhesive may be applied for example to the metal surface, followed by an intermediate layer of rubber cement on which is superposed the rubber face stock.

The solvent for the adhesive may be any of the known non-petroleum rubber solvents used either singly or as mixtures and preferably aromatic hydrocarbon solvents, e. g. toluene and/or solvent naphtha since these materials are very good solvents for both the rubber and the resin components of the adhesive mixture.

The adhesives may be used to adhere either soft or hard rubber to metals or other surfaces, for example ferrous base metals, aluminum and its alloys, copper and its alloys, wood, glass, Cellophane, concrete, fibrous materials, etc. To secure adhesion to copper and its alloys it is generally advisable to apply a coating of heat hardenable phenolic resin followed by baking before the application of the adhesive. The present adhesives are particularly useful in constructions where elevated temperatures, at which most rubber-to-metal adhesive are apt to fail, are encountered. Some specific suggestions are motor mountings, rubber-lined evaporators, and chemical equipment. Other uses are roll covering jobs, and for tank linings.

The proportions of the ingredients in our adhesives may be varied over a rather wide range without seriously affecting the efficiency of the adhesive; for example, the resin may be varied from 100 to 900 parts per 100 parts of rubber material. Resins of the type herein specified may be used singly or as mixtures to provide the resin component of the invention.

Typical adhesive compositions are embraced in the following formula, in which the parts are by weight:

Depolymerized vulcanized rubber _____ 100
Durez resin 7355 _____ 0–900
Durez resin 8188 _____ 900–0
Total Durez resin _____ 100–900
Hardening agent __ 2–40 per 100 parts Durez resin
Non-petroleum solvent in amount to give 15–35% solids.

The rubber solution, the resin solution, and the solvent are mixed in the desired proportions, conveniently by means of a high speed stirrer. The hardening agent is then added and the whole stirred until the composition is quite homogeneous.

For testing the adhesive strength of the compositions, A. S. T. M. test pieces of ferrous metal are coated with the adhesive by brushing or spraying, and dried. The rubber and coated metal surfaces are then pressed together, and cured for the appropriate time in a mold or jig. A tensile test was carried out according to A. S. T. M. specification D429-35T. Failure is denoted by complete separation in the test piece at the temperature of test (either 25° C. or 100° C.).

The following examples are further illustrative of the invention, utilizing solutions of vulcanized rubber of various types:

| Example Number | Rubber component | A.S.T.M. adhesion, lbs./sq. in. | |
|---|---|---|---|
| | | 25° C. | 100° C. |
| 1 | Whole tire reclaim | 400 | ¹265 |
| 2 | Inner tube reclaim | 410 | |
| 3 | Vulcanized tread compound | 205 | |
| 4 | Vulcanized tank lining compound | 325 | |
| 5 | Depolymerized inner tubes | 780 | ¹265 |

¹ Failure in the rubber section of the test piece. The adhesive layer remained intact.

In each case the adhesion values are higher than the minimum requirements considered essential for practical adhesion. Furthermore, at 100° C. there was no apparent softening of the adhesive layer, as determined manually by probing with a knife. Since the adhesive layer remains intact in every case, the readings obtained at 100° C. are a measure of the tensile or tear resistance of the rubber stock in the test piece rather than of the bonding strength of the adhesive, the latter exceeding the strength of the rubber.

The following examples are further illustrative of the good adhesion to various metallic surfaces obtained by the use of the invention. The adhesive contains 33.3 parts of depolymerized rubber and 5 parts of hexamethylene tetramine per 100 parts of Durez resin 7355.

| Example number | Metal | A. S. T. M. adhesion, lbs./sq. in. |
|---|---|---|
| 6 | Aluminum | 325 |
| 7 | Lead | 235 |
| 8 | Brass | 830 |

The following examples illustrate the use of the invention with hard rubber (ebonite) and semi-hard rubber stocks using the same formula as indicated for Examples 6, 7 and 8.

| Example number | Rubber face stock | A. S. T. M. adhesion, lbs./sq. in. (25° C.) |
|---|---|---|
| 9 | Semi-hard rubber compound | 1,130 |
| 10 | Hard rubber compound | 2,160 |

If desired there may be applied over the adhesive coating on the metal a coating of a rubber cement preferably one containing carbon black.

An advantage of the present adhesives is that they do not require the use of a primary or base coat previous to application of the adhesive.

The adhesive may be used further in the making of composite rubber articles, for example in the construction of tires, belts, etc.

The invention may be applied for the bonding of metal to rubber generally including natural as well as artificially-prepared rubbers, and reclaims thereof.

While we have herein disclosed with particular certainty certain preferred manners of performing our invention, we do not desire to limit ourselves solely thereto, for the precise proportions of the materials utilized may be varied without departing from the spirit and scope of the invention as defined in the appended claims.

Having thus described our invention, what we claim and desire to protect by Letters Patent is:

1. An adhesive composition comprising an admixture of a potentially reactive resinous reaction product of a mixture consisting of cashew nut shell oil and another phenol, with solubilized depolymerized vulcanized rubber, and a hardening agent for said resin, all of said ingredients being in solution in a solvent therefor.

2. A rubber-to-metal adhesive composition comprising an admixture of a potentially reactive resinous reaction product of a mixture consisting of cashew nut shell oil and another phenol, with solubilized depolymerized vulcanized rubber, and hexamethylene tetramine, all of said ingredients being in solution in a solvent therefor.

3. A composite rubber article in which rubber is bonded to another surface by means of the insoluble infusible product of the reaction of a methylene yielding body with the reaction product of a mixture consisting of cashew nut shell oil and another phenol in combination with solubilized depolymerized vulcanized rubber.

4. A composite rubber and metal article in which the rubber is bonded to the metal by means of the insoluble infusible product of the reaction of a methylene yielding body with the reaction product of a mixture consisting of cashew nut shell oil and another phenol in combination with solubilized depolymerized vulcanized rubber.

CHARLES F. BROWN.
GEORGE E. HULSE, Jr.